(12) United States Patent
Parks et al.

(10) Patent No.: US 8,398,352 B2
(45) Date of Patent: Mar. 19, 2013

(54) SEPARATION FASTENER WITH FRANGIBLE NUT

(75) Inventors: Brent Parks, Englewood, CO (US); Bradley W. Smith, Plain City, UT (US)

(73) Assignee: Autoliv ASP, Inc., Ogden, UT (US)

( * ) Notice: Subject to any disclaimer, the term of this patent is extended or adjusted under 35 U.S.C. 154(b) by 0 days.

(21) Appl. No.: 13/286,309

(22) Filed: Nov. 1, 2011

(65) Prior Publication Data
US 2012/0045291 A1 Feb. 23, 2012

Related U.S. Application Data

(62) Division of application No. 12/178,863, filed on Jul. 24, 2008, now abandoned.

(51) Int. Cl.
*F16B 37/08* (2006.01)
(52) U.S. Cl. .............. 411/433; 411/2; 411/20; 411/267
(58) Field of Classification Search .................. 411/433, 411/2, 20, 267
See application file for complete search history.

(56) References Cited

U.S. PATENT DOCUMENTS

| | | | | |
|---|---|---|---|---|
| 3,334,536 A | * | 8/1967 | Armstrong | 411/434 |
| 3,405,593 A | * | 10/1968 | Kriesel | 411/20 |
| 5,613,816 A | * | 3/1997 | Cabahug | 411/433 |
| 6,361,260 B1 | * | 3/2002 | Schirrmacher | 411/433 |

* cited by examiner

*Primary Examiner* — Roberta Delisle
(74) *Attorney, Agent, or Firm* — Sally J. Brown; Harness Dickey & Pierce PLC

(57) ABSTRACT

A separation fastener assembly includes a housing defining a cavity. A frangible nut is disposed in the cavity. The nut includes a plurality of nut segments. The one-piece frangible nut greatly reduces existing assembly problems and difficulties. Adjacent nut segments are interconnected at fracture lines. A bolt has an end coupled to the nut. A movable element is disposed in the housing and movable from a first position to a second position. In the first position, the nut segments are restrained from radial expansion. In the second position the nut segments are permitted to radially expand for releasing the fastener assembly.

21 Claims, 5 Drawing Sheets

SEPARATION FASTENER WITH FRANGIBLE NUT

CROSS-REFERENCE TO RELATED APPLICATIONS

This application is a divisional of U.S. patent application Ser. No. 12/178,863 filed on 24 Jul. 2008. The entire disclosure of the above application is incorporated herein by reference.

FIELD

The present disclosure generally relates to separation fasteners. More particularly, the present disclosure relates to a separation fastener assembly with a frangible nut.

BACKGROUND

The statements in this section merely provide background information related to the present disclosure and may not constitute prior art.

Separation fastener assemblies have been used for various applications and are generally responsive to a signal for releasing secured components. One type of separation fastener includes a pyrotechnic charge that is actuated to release the components. A typical assembly may include a nut having a plurality of discrete segments. The discrete segments are arranged within the fastener assembly to normally retain a bolt. When the separation fastener assembly is pyrotechnically actuated, the discrete nut segments move outward in response to an axial load on the bolt. As a result, the bolt is released.

While known pyrotechnically released fastener assemblies may have proven suitable for their intended applications, a continuous need in the pertinent art remains.

SUMMARY

According to one particular aspect, the present teachings provide a separation fastener assembly including a housing defining a cavity. A frangible nut is disposed in the cavity. The nut includes a plurality of nut segments. Adjacent nut segments are interconnected at fracture lines. A bolt has an end coupled to the nut. A movable element is disposed in the housing and movable from a first position to a second position. In the first position, the nut segments are restrained from radial expansion. In the second position the nut segments are permitted to radially expand for releasing the assembly.

According to another particular aspect, the present teachings provide a separation fastener assembly including a housing defining a cavity. A bolt has an end coupled to the nut and a head opposite the end. A movable element is disposed in the housing and radially surrounds the nut. The movable element is movable in a direction away from the head between a first position in which the nut is restrained from radial expansion to a second position in which the nut is permitted to radially expand.

According to a further particular aspect, the present teachings provide a separation fastener assembly including a housing defining a cavity and a nut disposed in the cavity. A bolt has an end coupled to the nut. A piston radially surrounds at least a portion of the nut to restrain the nut from radial expansion. An actuator is operative to pressurize a portion of the cavity to displace the piston from a first position to a second position. In the second position, the nut is free to radially expand in response to a load on the bolt.

According to yet a further aspect, the present teachings provide a method of releasing at least one secured component. The method includes providing a separation fastener having a housing defining a cavity, a frangible nut and a bolt. The method additionally includes inserting the frangible nut into the housing as a single piece and threadably engaging an end of the nut with the frangible nut to secure the at least one component. The method further includes fracturing the nut into a plurality of discrete segments. Fracturing of the nut may occur in response to torque introduced by the bolt during assembly or upon actuation of the separation fastener in response to a predetermined event.

Further areas of applicability will become apparent from the description provided herein. It should be understood that the description and specific examples are intended for purposes of illustration only and are not intended to limit the scope of the present disclosure.

DRAWINGS

The drawings described herein are for illustration purposes only and are not intended to limit the scope of the present disclosure in any way.

DESCRIPTION OF VARIOUS ASPECTS

Figure 1:
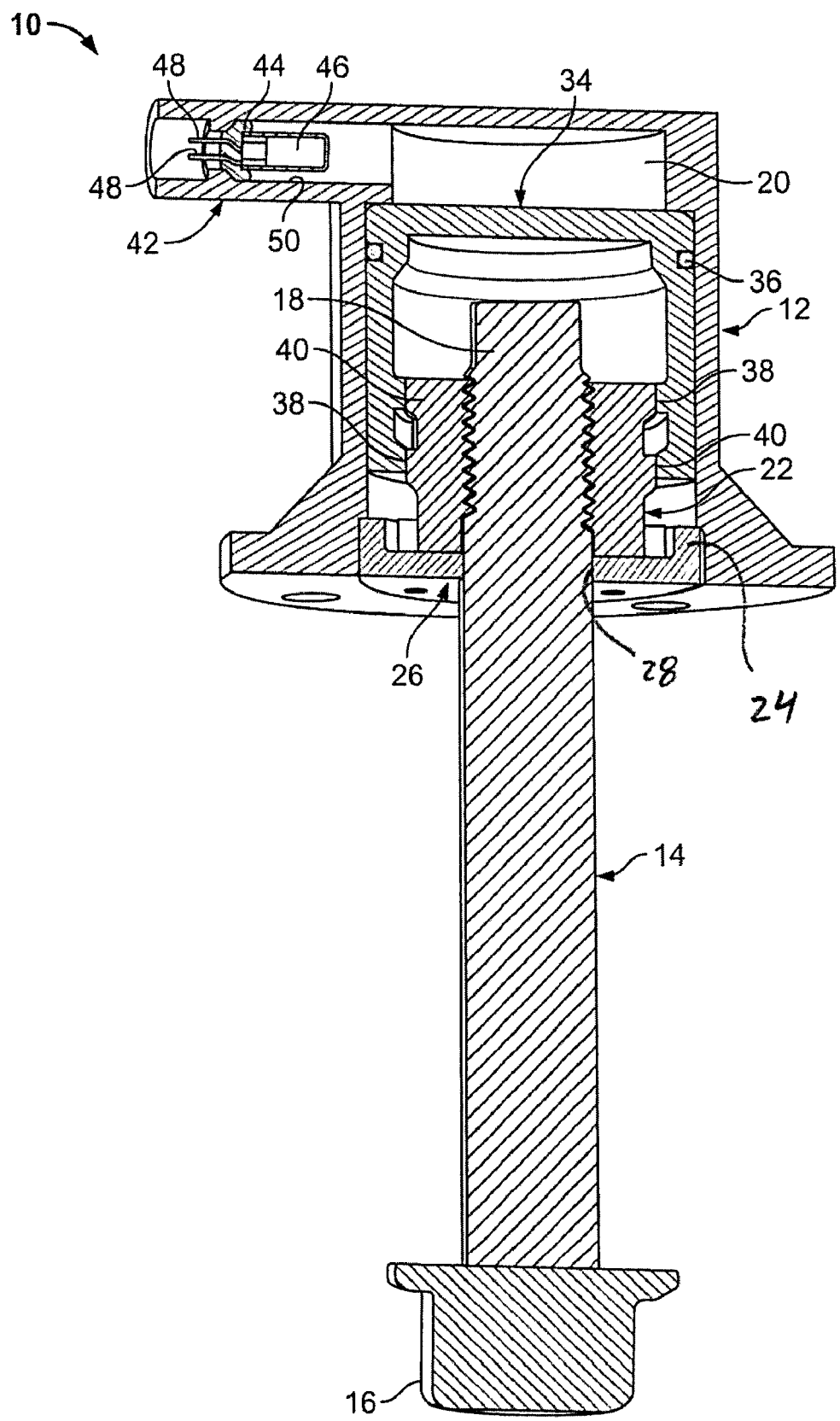
FIG. 1 is a cross-sectional view of a separation fastener assembly in accordance with the teachings of the present disclosure, the separation fastener assembly shown prior to release.

The following description is merely exemplary in nature and is not intended to limit the present disclosure, application, or uses. It should be understood that throughout the drawings, corresponding reference numerals indicate like or corresponding parts and features.

With initial reference to the FIGS. 1 through 4 of the drawings, which are drawn to scale, a separation fastener assembly in accordance with the present teachings is illustrated and generally identified at reference character 10. The separation fastener assembly 10 may be used to release at least one secured component in response to a predetermined event. For example, the separation fastener assembly 10 may be used to normally secure one or more components of a motor vehicle frame and release the component or components upon sensing of an impending vehicle collision for purposes of reducing the severity of the collision. It will be understood, however, that the present teachings have application beyond such an exemplary use.

Figure 2:
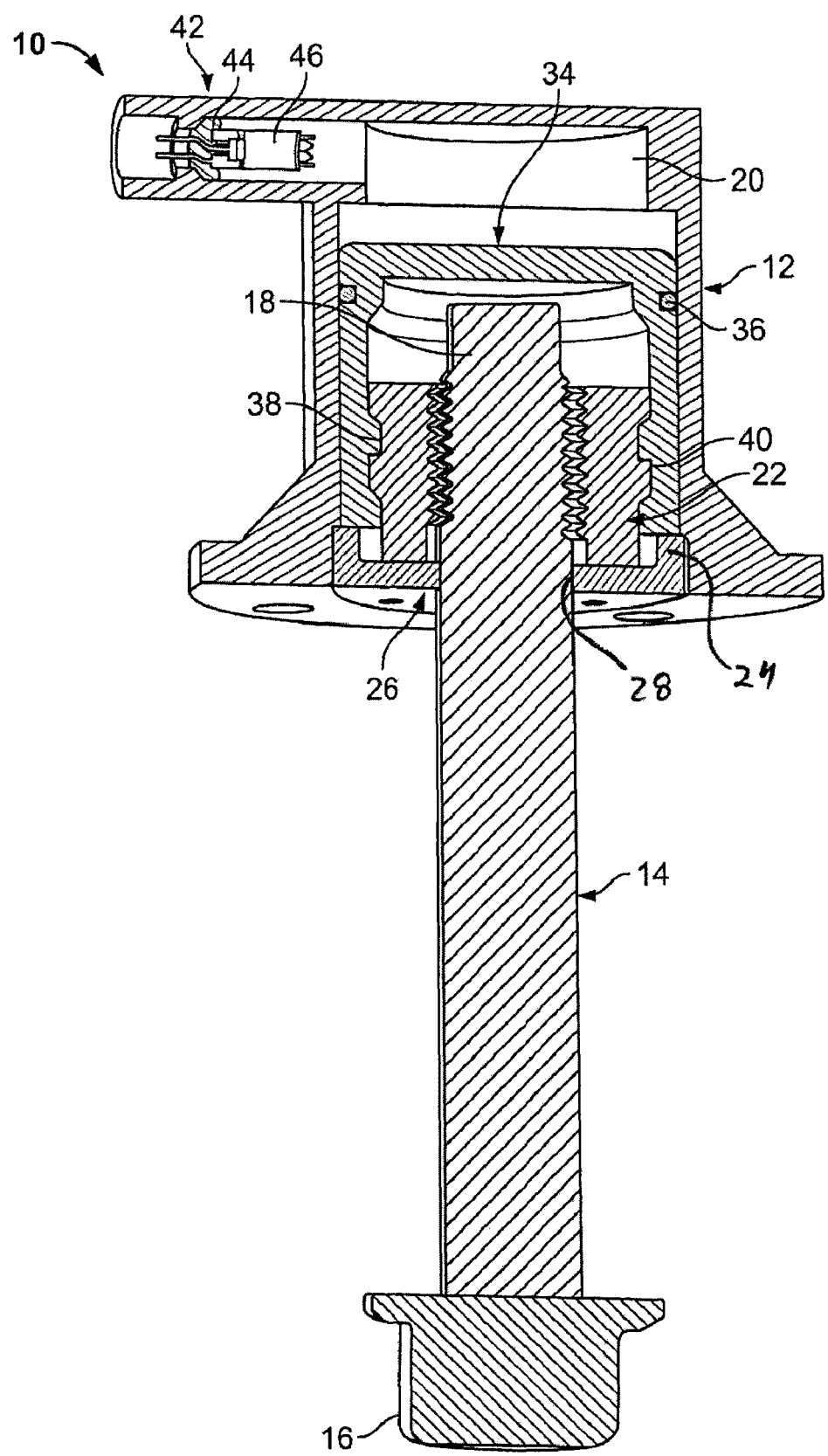
FIG. 2 is a cross-sectional view similar to FIG. 1, the separation fastener assembly shown after release.

The separation fastener assembly 10 is shown prior to release in FIG. 1 and after release in FIG. 2. The separation fastener assembly 10 is illustrated to generally include a housing 12. The housing 12 may be bolted or otherwise secured to a base (not shown) which may comprise a plate, a block or other structure including but not limited to, one or more elements to be secured with fastener assembly 10. Prior to release of the separation fastener assembly 10, the housing 12 may be positioned approximate to or adjacent the base.

The separation fastener assembly 10 further includes a bolt 14. The bolt 14 includes a head 16 and an opposite distal end 18. The end 18 of the bolt 14 is disposed within a cavity 20 defined by the housing 12. The end 18 may be coupled to a nut 22 disposed within the cavity 20. As illustrated, the end 18 may threadably engage the nut 22.

The housing 12 may include a lower cap 26. The cap 26 may include a disc-shaped portion defining an opening 28 for receiving the bolt 14. The cap 26 may further include a circumferential flange 24. The cap 26 may be secured to the remainder of the housing 12 in any manner well known in the art.

Figure 3:
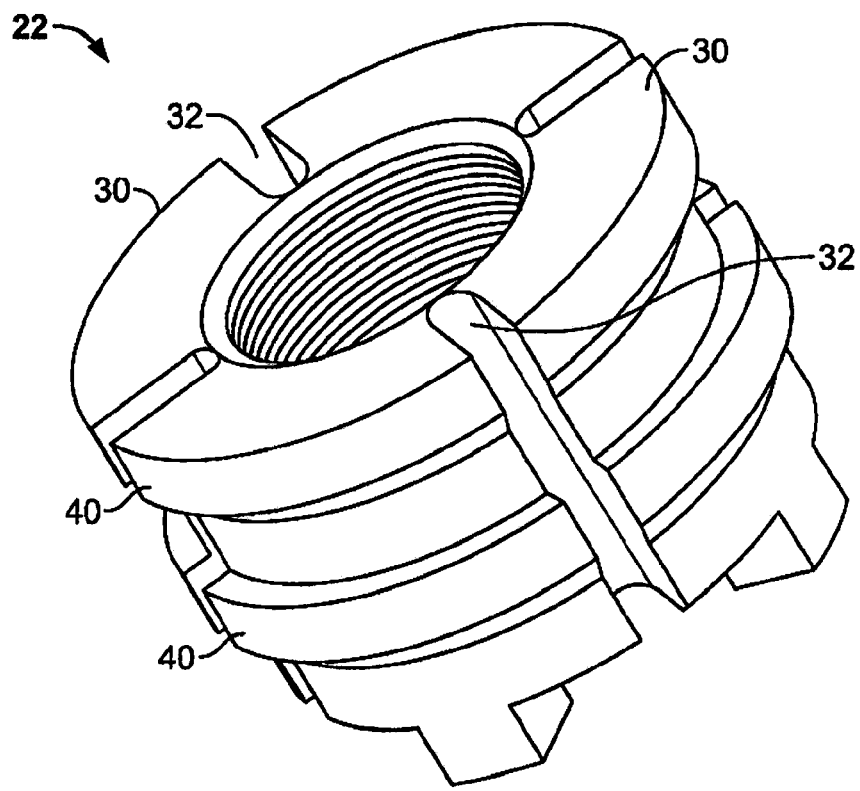
FIG. 3 is an enlarged perspective view of a nut of the separation fastener assembly of FIG. 1 shown removed from the separation fastener assembly for purposes of illustration, the nut shown is prior to release.
Figure 4:
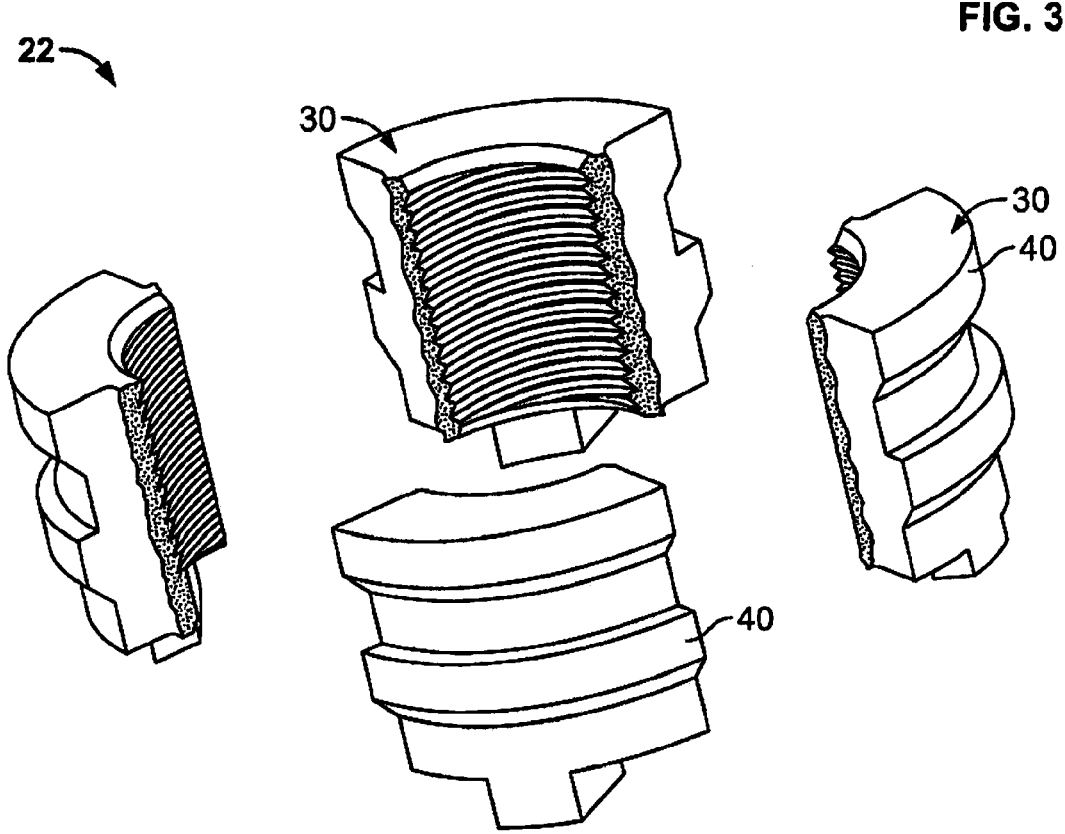
FIG. 4 is another enlarged perspective view of the nut of FIG. 3, the nut shown is after release.
Figure 5:
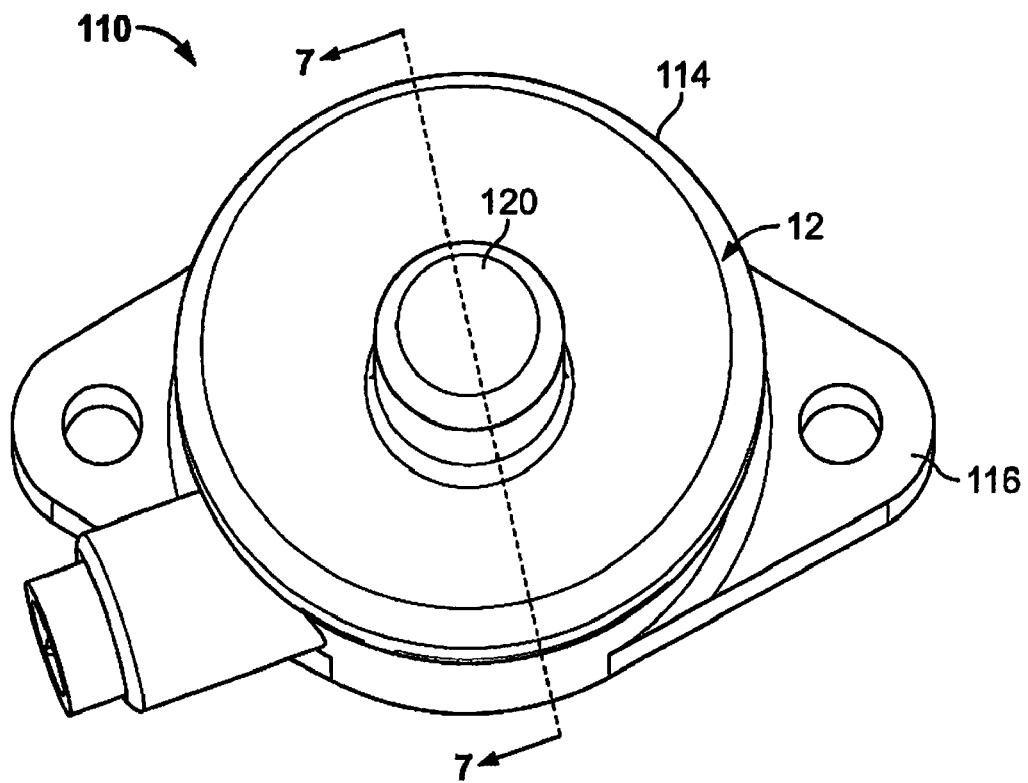
FIG. 5 is a top perspective view of another separation fastener assembly in accordance with the teachings of the present disclosure.
Figure 6:
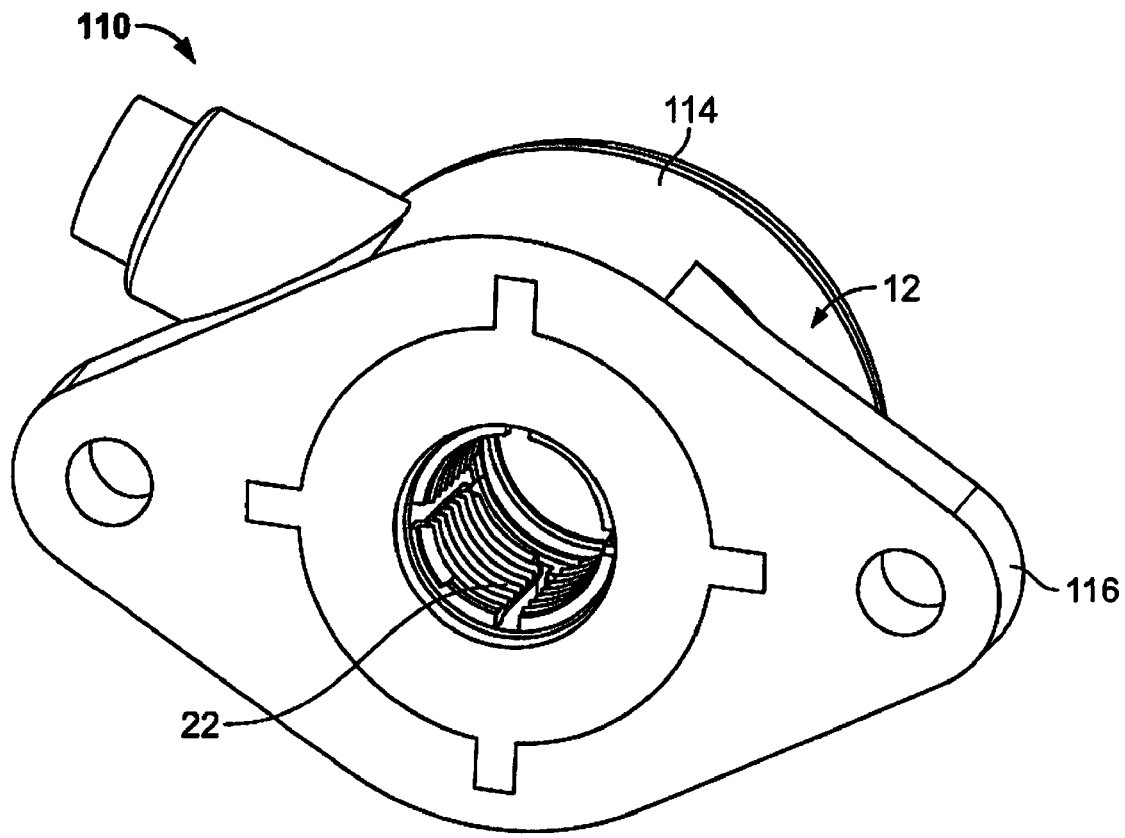
FIG. 6 is a bottom perspective view of the separation fastener assembly of FIG. 15.
Figure 7:
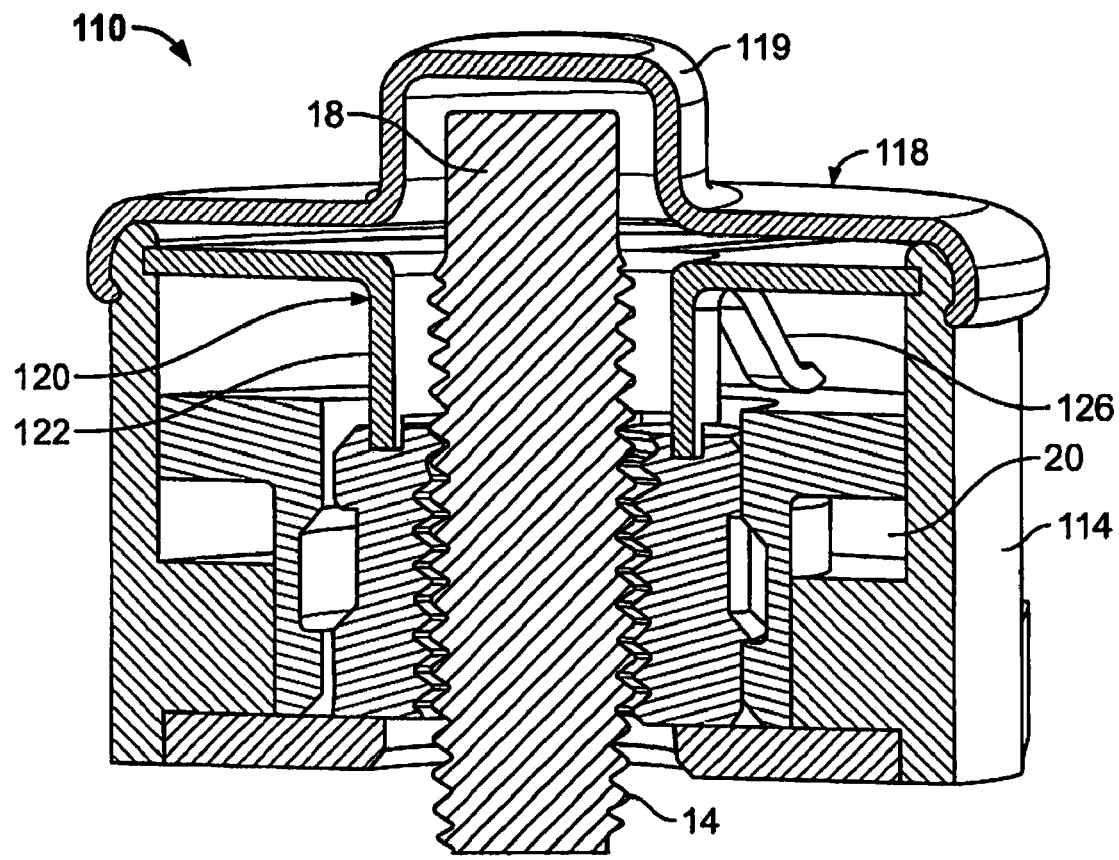
FIG. 7 is a cross-sectional view taken along the line 7-7 of FIG. 5, the separation fastener assembly shown prior to activation of a reactive charge.
Figure 8:
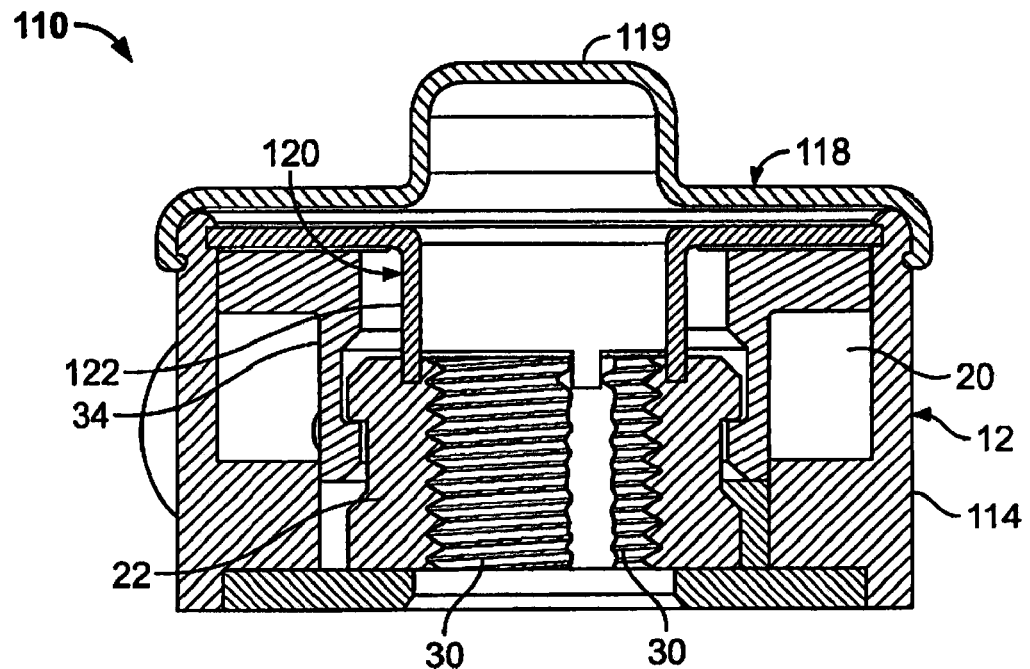
FIG. 8 is a cross-sectional view similar to FIG. 7, the separation fastener assembly shown after activation of the reactive charge.

As particularly shown in FIGS. 3 and 4, the nut 22 may include a plurality of segments 30. The plurality of segments 30 may be connected to one another through fracture lines 32 such that the nut 22 is a frangible nut. For other applications within the scope of the present teachings, however, the plurality of segments 30 may alternatively be a plurality of discrete segments. The frangible nature of the nut 22 ensures alignment of the internal threads formed thereon for meshing engagement with the bolt 14. In this manner, assembly and manufacturing issues are greatly reduced.

The frangible nut 22 may be manufactured from a powdered metal process. The powdered metal process may yield a nut 22 having high compression strength and low elongation values, resulting in a component having brittle characteristics. The nut 22 may be alternatively manufactured with any other suitable material capable of functioning as described herein.

The separation fastener assembly 10 may further include a movable element 34. The movable element 34 may be disposed in the cavity 20 of the housing 12 and may be movable between a first position (shown in FIG. 1, for example) and a second position (shown in FIG. 2, for example). As will be discussed below, the segments 30 of the nut 22 are restrained from radial expansion in the first position. In the second position, the segments 30 of the nut 22 are permitted to radially expand.

The movable element 34 may comprise a piston. The piston 34 may include a cylindrical sidewall. An o-ring 36 may be disposed between the piston 34 and the housing 12 to provide a seal.

The piston 34 may include one or more portions 38 which normally abut corresponding portions 40 of the nut 22 such that the piston restrains the segments 30 of the nut 22 from radial expansion. The portions 38 may include a pair of features extending radially inward from the sidewall of the piston 34. The portions 40 may include a pair of features radially extending outward from the nut 22.

The separation fastener assembly 10 may further include an actuator 42 carried by the housing 12. The actuator 42 may be in communication with the cavity 20 and may be operative to displace the piston 34 from a first position to a second position. In the first position, the features 38 align with the features 40 and the segments 30 of the nut 22 are retained from radial expansion. In the second position, the features 38 and 40 are no longer aligned and radial expansion of the segments 30 of the nut 22 is permitted such that the bolt 14 maybe withdrawn from the housing 12.

The actuator 42 may comprise a pyrotechnic initiator. The initiator 42 may comprise any suitable initiator. One suitable initiator is shown and described in commonly assigned U.S. Pat. No. 7,210,703, which is hereby incorporated by reference in its entirety. As such, the initiator exemplary initiator 42 will not be discussed in detail herein. Briefly, however, the initiator 42 may include a squib 44, a pyrotechnic charge 46, a pair of conductive pins 48 and a bridgewire (not specifically shown). The squib 44 can produce an actuation or ignition upon receipt of a signal, such as an electrical current, as will be discussed.

The reactive charge 46 may be in communication with the cavity 20 through an input port 50. The reactive charge 46 may be in communication with and responsive to the squib 44 to actuate or ignite upon receipt of the charge from the squib 44. Typically, the actuation of the reactive charge 46 can create a burst or pressure wave, which may radiate away from the reactive charge 46 in a direction generally toward the cavity 20. The ballistic output pressurizes the cavity 20, as will be discussed herein.

Additional reactive charge 46 can also be packed about the bridgewire, if desired. Upon receipt of a signal, an electrical current may be introduced to the pins 48. The signal may be indicative of an impending collision or other vehicle event in which release of the components secured by the separation fastener assembly 10 is desired, for example. The introduction of the electric current may cause the initiator 42 to fire, and produce a actuation or ignition, which in turn, can actuate the reactive charge 46 to create the ballistic output for pressurizing the portion of the cavity 20.

Upon assembly, the base 26 reacts the torque of the nut 22 and bolt 14. For certain applications, a low level of torque may be introduced during assembly to fracture the nut 22 into the discrete segments 30. In this manner, the nut 22 may be pre-broken prior to actuation of the assembly 10. Alternatively, the nut 22 may be fractured into the discrete segments 30 during actuation.

With continued reference to FIGS. 1 and 2, operation of the separation fastener assembly 10 will be described. Upon actuation of the reactive charge 46, the cavity 20 may be pressurized. In the embodiment illustrated, actuation of the reactive charge 46 pressurizes an upper portion of the cavity 20 and results in downward translation of the piston 34 within the cavity 20. This downward translation of the piston 34 removes the radial restraint of the features 38 from the features 40 of the nut 22. As such, the segments 30 of the nut 22 are no longer radially restrained and may be freely radially expanded in response to an axial load on the bolt 14. The axial force on the bolt 14 may withdraw the end 18 of the bolt 22 from the housing 12.

Turning to FIGS. 5 through 8, another separation fastener assembly in accordance with the present teachings is illustrated and generally identified at reference character 110. Given the similarities between the separation fastener assembly 110 and the separation fastener assembly 10, like reference numerals will be used to identify similar elements throughout the drawings. As with the separation fastener assembly 10, the separation fastener assembly 110 includes a piston 34 including detents which may be in the form of radial features 38. The features 38 normally abut the features 40 of the nut 22. According to one aspect, the separation fastener assembly 110 differs from the assembly 10 in that a lower end of the housing cavity 20 is pressurized and the piston 34 translates into the housing 12. In this manner, the design of the separation fastener assembly 110 may be more compact.

The housing 12 may include a generally cylindrical sidewall 114 and a mounting flange 116. The housing 12 may further include a cap 118 crimped or otherwise suitable secured to the sidewall 114. The cap 118 may include a central dome 119 for accommodating the end 18 of the bolt 14.

The separation fastener assembly 110 may further include a spacer member 120. The spacer member 120 may include a downwardly extending tab 122 for holding the nut 22 in place. The spacer member 120 may also function to normally retain the piston 34 in the first position and may include a deflectable leg 126 for abutting the piston 34. The deflectable leg 126 may inelastically deform as the piston 34 translates from the first position to the second position.

In operation, the reactive charge 46 pressurizes a lower portion of the cavity 20 and thereby upwardly displaces the piston 34. The leg 126 is inelastically deflected. The upward translation of the piston 34 removes the radial restraint of the features 38 from the features 40 of the nut 22. As such, the segments 30 of the nut 22 are no longer radially restrained and may be freely radially expanded in response to an axial load on the bolt 14. The axial force on the bolt 14 may withdraw the end 18 of the bolt 22 from the housing 12.

While specific examples have been described in the specification and illustrated in the drawings, it will be understood by those skilled in the art that various changes may be made and equivalence may be substituted for elements thereof without departing from the scope of the present teachings as defined in the claims. Furthermore, the mixing and matching of features, elements and/or functions between various examples may be expressly contemplated herein so that one skilled in the art would appreciate from the present teachings that features, elements and/or functions of one example may be incorporated into another example as appropriate, unless described otherwise above. Moreover, many modifications may be made to adapt a particular situation or material to the present teachings without departing from the essential scope thereof. Therefore, it may be intended that the present teachings not be limited to the particular examples illustrated by the drawings and described in the specification as the best mode of presently contemplated for carrying out the present teachings but that the scope of the present disclosure will include any embodiments following within the foregoing description and any appended claims.

What is claimed is:

1. A separation fastener assembly comprising:
   a housing defining a cavity;
   a frangible nut disposed in the cavity, the nut including a plurality of nut segments;
   a bolt having an end coupled to the frangible nut; and
   a movable element disposed in the housing and movable from a first position in which the nut segments are restrained from radial expansion to a second position in which the nut segments are permitted to radially expand;
   wherein the bolt includes a head opposite the end coupled to the nut and the movable element moves in a direction away from the head from the first position to the second position.

2. The separation fastener assembly of claim 1, wherein the movable element is a piston radially surrounding the nut.

3. The separation fastener assembly of claim 2, further comprising a reactive charge for pressurizing the cavity to displace the piston from the first position to the second position.

4. The separation fastener assembly of claim 1, wherein the housing includes an input port in fluid communication with the cavity for introducing a source of pressurized gas to displace the movable element from the first position to the second position.

5. The separation fastener assembly of claim 4, wherein the housing includes a generally cylindrical sidewall defining the input port.

6. The separation fastener assembly of claim 1, wherein adjacent segments of the frangible nut are connected at fracture lines.

7. The separation fastener assembly of claim 1, wherein the nut includes a plurality of nut segments.

8. The separation fastener assembly of claim 1, further comprising a spacer member for normally restraining the movable element in the first position.

9. A separation fastener assembly comprising:
   a housing defining a cavity;
   a bolt having an end coupled to a nut and a head opposite the end; and
   a movable element disposed in the housing and radially surrounding the nut, the movable element movable in a direction away from the head between a first position in which the nut is restrained from radial expansion to a second position in which the nut is permitted to radially expand.

10. The separation fastener assembly of claim 9, wherein the nut includes a plurality of discrete nut segments.

11. The separation fastener assembly of claim 9, wherein the nut is a frangible nut including a plurality of nut segments, adjacent nut segments interconnected at fracture lines.

12. The separation fastener assembly of claim 9, wherein the movable element is a piston.

13. The separation fastener assembly of claim 12, further comprising a pyrotechnic actuator for pressurizing a portion of the cavity to displace the piston from the first position to the second position.

14. The separation fastener assembly of claim 9, further comprising a spacer member for normally retaining the movable element in the first position.

15. The separation fastener assembly of claim 14, wherein the spacer member includes a deflectable leg, the leg being inelastically deflectable upon movement of the movable element from the first position to the second position.

16. The separation fastener assembly of claim 9, wherein the housing includes an open end for receiving the end of the bolt and a closed end, the movable element movable toward the closed end between the first position and the second position.

17. A separation fastener assembly comprising:
   a housing defining a cavity;
   a nut disposed in the cavity;
   a bolt having an end coupled to the nut;
   a piston radially surrounding at least a portion of the nut to restrain the nut from radial expansion; and
   an actuator for pressurizing a portion of the cavity to displace the piston from a first position in which the nut is restrained from radial expansion to a second position in which the nut is free to radially expand in response to a load on the bolt;
   wherein the bolt includes a head opposite the end coupled to nut, the piston movable away from the head from the first position to the second position.

18. The separation fastener assembly of claim 17, wherein the actuator is a pyrotechnic actuator.

19. The separation fastener assembly of claim 17, wherein the nut is a frangible nut.

20. The separation fastener assembly of claim 17, wherein the housing includes an open end for receiving the end of the bolt and a closed end, the piston movable toward the closed end upon pressurization of the portion of the cavity.

21. The separation fastener assembly of claim 17, further comprising a spacer member for normally restraining the movable element in the first position.

* * * * *

UNITED STATES PATENT AND TRADEMARK OFFICE
CERTIFICATE OF CORRECTION

PATENT NO. : 8,398,352 B2  
APPLICATION NO. : 13/286309  
DATED : March 19, 2013  
INVENTOR(S) : Brent Parks, Bradley Smith and Heath Knight-Newbury Page 1 of 1

It is certified that error appears in the above-identified patent and that said Letters Patent is hereby corrected as shown below:

Title Page, Item [75] Inventors: Brent Parks, Englewood, CO (US);  
                                                  Bradley W. Smith, Plain City, UT (US)

Should read: --Brent Parks, Englewood, CO (US);  
                                Bradley W. Smith, Plain City, UT (US);  
                                Heath Knight-Newbury, Goteborg (SE)--

Signed and Sealed this  
Second Day of July, 2013

Teresa Stanek Rea  
*Acting Director of the United States Patent and Trademark Office*